United States Patent Office 2,731,501
Patented Jan. 17, 1956

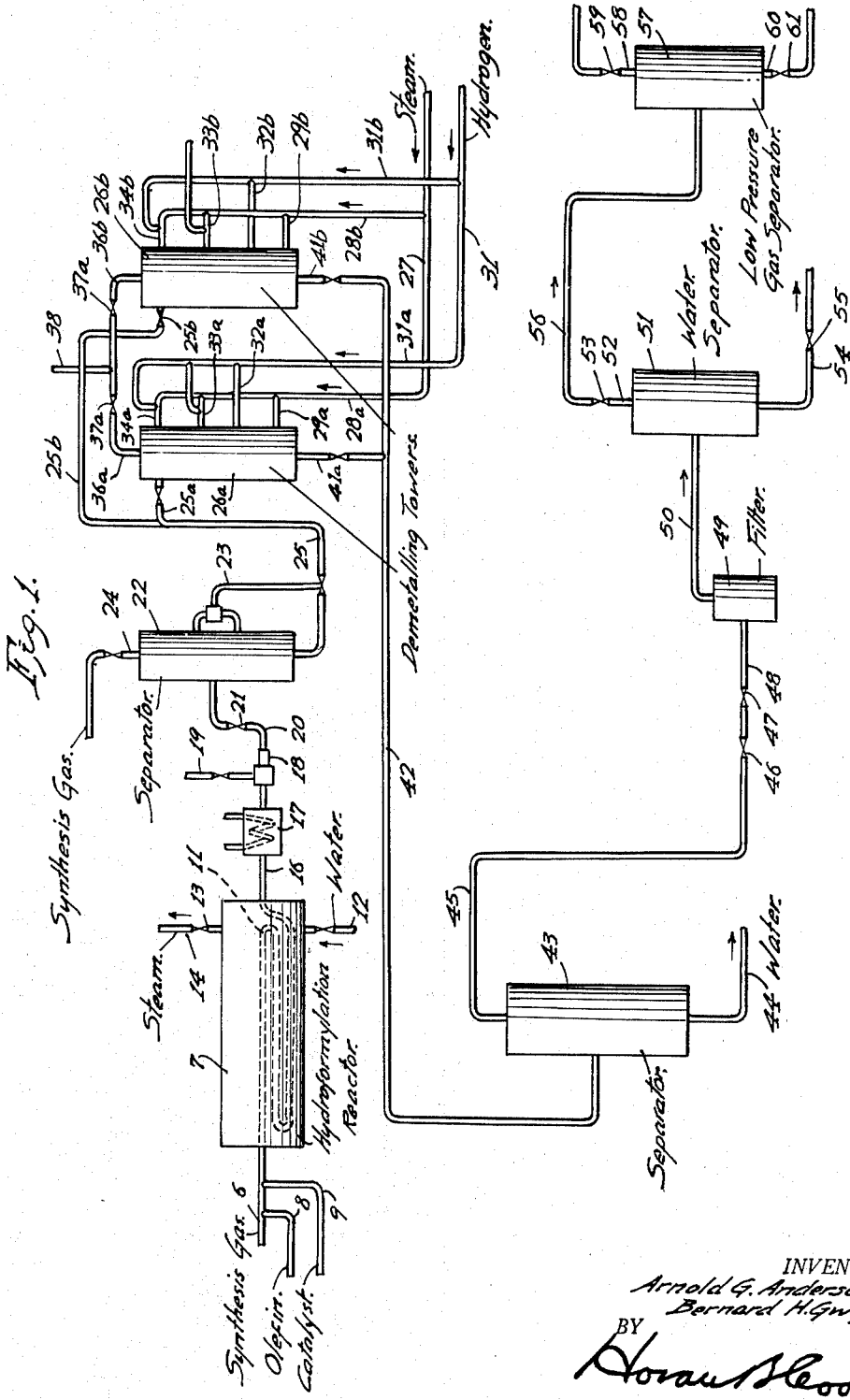

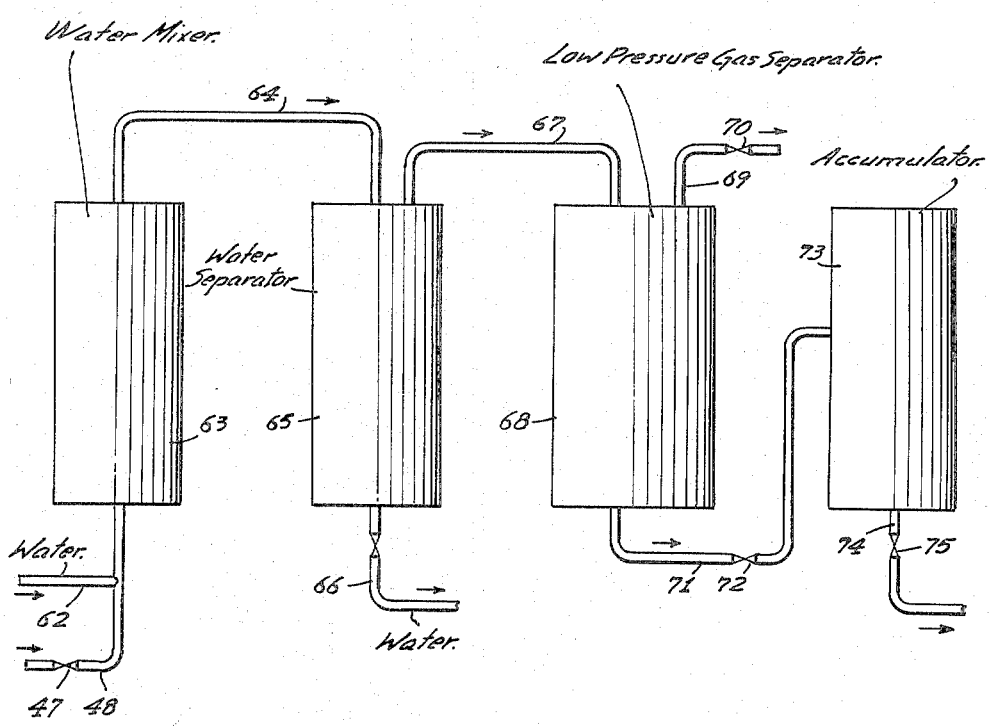

2,731,501

PURIFICATION OF HYDROFORMYLATION REACTION PRODUCTS

Arnold G. Anderson, Plum Township, Allegheny County, and Bernard H. Gwynn, Fawn Township, Allegheny County, Pa., assignors to Gulf Research & Development Company, Pittsburgh, Pa., a corporation of Delaware Application November 21, 1952, Serial No. 321,904

3 Claims. (Cl. 260—604)

This invention relates to a process for purifying hydroformylation stage products and more particularly to a process for preparing emulsion-free hydroformylation stage products.

During hydroformylation, olefins are reacted in the presence of a catalyst, preferably a cobalt or iron catalyst, with a synthesis gas comprising hydrogen and carbon monoxide to produce aldehydes which can be purified and employed as such or hydrogenated to produce alcohols. The combination of a hydroformylation step and a hydrogenation step is generally known as the Oxo process.

In the hydroformylation step, an elevated superatmospheric pressure such as a pressure of about 1500 to about 4500 pounds per square inch gauge and an elevated temperature such as a temperature of about 100° to about 600° F. are employed. The hydroformylation reaction product contains unreacted olefins, carbon monoxide and hydrogen, oxygenated organic reaction products and metal carbonyls. The oxygenated organic products comprise chiefly aldehydes and smaller amounts of alcohols and acetals.

It is desirable to remove the metal carbonyls from the hydroformylation reaction product when the aldehydes are to be separated and employed as such. It is even more desirable to remove metal carbonyls when the hydroformylation reaction product is to be hydrogenated because the metals which result from decomposition of the metal carbonyls lower the efficiency and decrease the life of hydrogenation catalysts.

The metal carbonyls contained in the hydroformylation reaction product at a hydroformylation reaction pressure and temperature can be removed from the hydroformylation reaction product by cooling the product at the hydroformylation reaction pressure, reducing the pressure and then heating the hydroformylation reaction product above the decomposition temperature of the metal carbonyls at the reduced pressure. The decomposition of metal carbonyls is preferably carried out in a demetalling zone containing pumice or other similar inert packing material by passing the hydroformylation reaction product and steam through the demetalling zone. Preferred results are obtained when the hydroformylation products are passed downwardly and steam and an inert gas such as hydrogen are passed upwardly through the demetalling zone. The steam heats the hydroformylation products above the decomposition temperature of the metal carbonyls at the intermediate pressure, and the free metals resulting from the decomposition are deposited upon the packing material.

By operating in this manner, cobalt and other metal carbonyls can be removed from the hydroformylation reaction product and deposited on the packing material, and a demetalled hydroformylation reaction product admixed with water is removed from the bottom of the demetalling chamber. While the hydroformylation product is substantially free of metal, the water in such mixture carries with it considerable amounts of dissolved metals or metal salts, pulverized or finely divided pumice and other solid materials. To remove the dissolved metals or metal salts from this mixture, it is important, therefore, that the water carrying these metals or metal salts be separated from the mixture. The difficulty arises, however, that, in removing this mixture from the bottom of the demetalling chamber so that the aqueous phase carrying the dissolved metal or metal salts may be removed therefrom, an emulsion is formed and it becomes almost impossible to separate the water from the demetalled hydroformylation reaction product.

We have found that the foregoing difficulty can be avoided and the formation of an emulsion can be prevented by removing the demetalled hydroformylation reaction product from the demetalling zone, and then separating the water from the hydroformylation reaction product while the product is still at the intermediate pressure existing in the demetalling zone. The pressure on the substantially water-free hydroformylation reaction product may then be either increased or reduced. In the event the metal has not been removed to the desired extent in the water separation zone, the hydroformylation reaction product may be either filtered or given a water wash to further reduce the metal content thereof.

The temperature and pressure of the hydroformylation reaction product issuing from the demetalling zone depends upon the conditions employed in that zone. The hydroformylation product containing metal carbonyls at the intermediate pressure is introduced into the demetalling zone at a temperature low enough not to cause decomposition of the metal carbonyl with the lowest decomposition temperature. The hydroformylation product is then heated in the demetalling zone to a temperature high enough to cause the decomposition of all of the carbonyl contained in the hydroformylation reaction product. The intermediate pressure employed is adjusted so that the steam does not have to be heated to too high a temperature and yet the partial pressure of steam in the resulting mixture in the demetalling zone must be high enough to obtain the desired temperature in the demetalling zone. When a cobalt compound is employed as the catalyst in the hydroformylation reaction zone, the hydroformylation reaction product introduced into the demetalling zone is initially at a temperature below about 120° F. and is raised to a temperature below about 300° F. and a temperature above about 150° F. and preferably a temperature of about 165° to about 212° F. to decompose the cobalt carbonyl. A temperature of about 340° to about 420° F. decomposes the other metal carbonyls. When the hydroformylation reaction product does not contain cobalt carbonyl, a much higher initial temperature such as above about 300° F. can be employed. A pressure in the range of about 25 to about 500 pounds per square inch gauge can be employed as the intermediate pressure, but this will vary with the temperature of the operation, the olefin charged to the hydroformylation zone and the vapor pressure of the hydrocarbons or oxygenated products present in the stream after passing through the hydroformylation zone.

In order that the invention may be understood more fully, reference should be had to the attached drawings which are hereby incorporated and made a part of this specification. Figure 1 is a flow diagram of a preferred embodiment of a process for the production of an emulsion-free hydroformylation product according to our invention. Figure 2 is a flow diagram showing a modification of the process set forth in Figure 1. In the drawings, the showing of many flow control devices has been omitted in the interest of clarity.

Referring to Figure 1 in a typical example about 13 mols per hour each of hydrogen and carbon monoxide are flowed through line 6 leading to hydroformylation reactor 7. About 13 mols per hour of a suitable olefin, for example heptene, are introduced to line 6 through line 8 and a solution of a suitable catalytic metal salt is also introduced to line 6 through line 9. This catalyst may be, for example, a cobalt salt of any suitable organic acid, such as a fatty acid, preferably one containing at least 6 carbon atoms, or a naphthenic acid. Examples of such salts are cobalt octanoate and cobalt naphthenate. Salts of this type are preferably introduced in solution in naphtha. In general the catalyst should be introduced in an amount corresponding to about one molecular proportion of cobalt for each 600 mols of the olefin.

The elongated hydroformylation reactor 7, maintained within a few degrees of the desired reaction temperature, contains an elongated reaction zone or coil 11 immersed in a body of water under pressure at its boiling point at that pressure. For example, for a reaction temperature of about 350° F., the water should be maintained at a pressure of about 120 pounds per square inch gauge. The water is introduced to hydroformylation reactor 7 through a valved line 12 and the pressure is maintained therein by means of a pressure control valve 13 in line 14 which releases the steam generated by reason of the exothermic reaction occurring within coil 11. The elongated reaction zone, or coil 11, is extremely long compared to its diameter, having an elongation factor (ratio of length to diameter) of at least 1440. At the conditions indicated, the synthesis gas, olefin and catalyst are flowed through the reaction zone under turbulent flow conditions and the desired hydroformylation reaction resulting in the production of aldehydes is accomplished. During the initial stages, the cobalt salt is apparently converted to cobalt carbonyl and therefore the hydroformylation stage product removed through line 16 contains aldehydes, some alcohols, unreacted olefins and synthesis gas, and cobalt carbonyl. Also even in cases where iron is not employed as a catalyst, the product frequently contains a small amount of iron, apparently also present as the carbonyl, since it appears that some iron is picked up from the equipment employed.

The hydroformylation product at substantially the reaction temperature is then cooled in cooler 17 to reduce the temperature, for example, to a temperature of about 100° to about 120° F., and then is introduced into a high-pressure separator 18 from which some excess synthesis gas is removed through valved line 19. The hydroformylation product is passed from separator 18 through line 20 provided with pressure reducing valve 21 to a separator 22 containing liquid level device 23. Separator 22 is operated at the pressure of about 300 pounds per square inch gauge. Synthesis gas is passed overhead from separator 22 through valve line 24. This synthesis gas may be decobalted and recycled, if desired, by apparatus which is not shown. The liquid hydroformylation product removed from separator 22 is flowed through lines 25 and 25a and is passed into decobalting tower 26a filled with an inert porous material, such as pumice or the like. One tower is used at a time since it is necessary periodically to remove or revivify the pumice, although if desired both towers may be operated in parallel. While the towers shown are referred to as decobalting towers, it is understood that they may also be employed to remove other metals in the hydroformylation reaction product. Of course in the case where a catalyst other than cobalt is used in a hydroformylation reaction, the towers will be used primarily for recovering that metal. Also, as previously noted, in the usual case where a cobalt catalyst is employed, the hydroformylation product will also contain some iron normally in the form of iron carbonyl.

Assuming that tower 26a is in operation, this tower is preferably operated at a pressure of about 200 to 250 pounds per square inch gauge. There is introduced into the bottom of the tower through manifold line 27 and lines 28a and 29a steam at a pressure such as to produce in the bottom of the tower a temperature of about 375° to about 400° F. At a point somewhat above the bottom of the bed of pumice, hydrogen is introduced into the tower through a manifold line 31 and a line 32a. The hydrogen has the effect of reducing the partial pressure of the steam and causing the steam to move upwardly through the tower. Also at spaced points along the tower, a mixture of steam and hydrogen is introduced through lines 33a and 34a. The portions of steam and hydrogen are adjusted so as to maintain the desired temperature gradient upwardly through the tower which is preferably from about 380° to about 100° F. Under these conditions, the cobalt carbonyl in the hydroformylation product is decomposed in the upper portion of the tower and the resulting cobalt is deposited on the pumice. Other metal carbonyls are decomposed at higher temperatures and therefore those metals will be decomposed on the pumice in the lower portion of the bed of pumice. The gases leaving the top of tower 26a are removed through line 36a provided with valve 37a and since these gases contain a substantial amount of impurities, they are vented to the atmosphere through line 38.

The hydroformylation reaction product substantially free of metals but admixed with water is removed from the tower through line 41a and line 42 and is passed to separator 43 which is operated at a pressure approximately the same as that existing in tower 26a, which, in this instance, is at a pressure of about 200 to 250 pounds per square inch gauge. In separator 43 the water is separated from the oxygenated products and unreacted olefins. The water containing an appreciable amount of dissolved cobalt and other metal salts and also some finely divided pumice is removed from the bottom of separator 43 by line 44 and is discharged as waste or passed to a recovery unit for recovery of dissolved metals and/or oxygenated materials.

The substantially water-free hydroformylation reaction product is then removed from the upper portion of separator 43 by line 45 containing a liquid level control valve 46 which is actuated by means of a liquid level control mechanism (not shown) in tower 26a and then is passed to pressure reducing valve 47. In this valve the pressure is reduced from about 200 to 250 pounds per square inch gauge to substantially atmospheric pressure.

The hydroformylation reaction product substantially at atmospheric pressure is thereafter, in a preferred embodiment, passed by line 48 to filter 49 which may be a mechanical filter or a clay filter. The filter is effective to remove from the hydroformylation product additional suspended material such as pulverized and finely divided pumice and other solid particles which were not removed with the water in separator 43. In addition, the filter helps in breaking any emulsion which may be formed by aqueous and organic materials which may be present in the hydroformylation reaction product. The filtered hydroformylation reaction product at substantially atmospheric pressure is removed overhead by line 50 and is passed to water separator 51. The hydroformylation product is removed overhead from water separator 51 by line 52 containing valve 53, and additional water not previously removed in water separator 43 is removed by line 54 containing valve 55. The hydroformylation product is then passed by line 56 to low pressure gas separator 57. A mixture of hydrogen and carbon monoxide is removed overhead from low-pressure separator 57 by line 58 containing valve 59 and may be recycled or vented to the atmosphere. The liquid hydroformylation product is removed from the bottom of pressure separator 57 by line 60 and is discharged through valve 61 for further separation or processing by apparatus not shown.

In the embodiment of our invention illustrated in Figure 2, instead of passing the substantially water-free hydroformylation reaction product in line 48 through a filter, we dilute or wash the substantially water-free hydroformylation reaction product with water and thereafter pass the resultant mixture to a water separator wherein the water and the hydroformylation reaction product are separated as before.

More specifically, with reference to Figure 2, water from line 62 is introduced into line 48 carrying the substantially water-free hydroformylation reaction product at substantially atmospheric pressure, and the resulting mixture is passed to water mixer 63 wherein the added water can thoroughly contact the organic matter and dilute the pulverized or finely divided pumice, metal salts or metal particles, and other solid materials which may still be present in the hydroformylation reaction product and which were not removed in separater 43. The mixture of hydroformylation reaction product and water is then passed by line 64 to water separator 65 where water is separated from the hydroformylation reaction product. The water containing an appreciable amount of solid materials and dissolved metal not previously removed in separator 43 is removed from separator 65 by valved line 66 and is discharged as waste.

The hydroformylation reaction product leaving separator 65 substantially free of water and solid materials is removed by line 67 and passed to low pressure gas separator 68. A mixture of hydrogen and carbon monoxide is removed overhead from low pressure separator 68 by line 69 containing valve 70 and may be recycled or vented to the atmosphere. The liquid hydroformylation product is removed from the bottom of pressure separator 68 by line 71 containing valve 72 and is passed to accumulator 73, where the hydroformylation product is stored or accumulated. The liquid hydroformylation product is removed as desired from the bottom of accumulator 73 by line 74 containing valve 75 for further separation or processing by apparatus not shown.

Obviously many modifications and variations of the invention as hereinbefore set forth may be made without departing from the spirit and scope thereof; therefore, only such limitations should be imposed as are indicated in the appended claims.

We claim:

1. A process which comprises reacting an olefin with hydrogen and carbon monoxide in the presence of a cobalt salt at an elevated temperature and a pressure above about 1500 pounds per square inch to obtain a hydroformylation mixture comprising an aldehyde and at least one metal carbonyl, passing said mixture at a pressure of about 25 to about 500 pounds per square inch and a temperature initially below the decomposition temperature of the metal carbonyl with the lowest decomposition temperature at said latter pressure through a demetalling zone containing packing material, passing steam and an inert gas upwardly through said demetalling zone, the amount and pressure of said steam being adjusted to heat the hydroformylation mixture in the demetalling zone to the decomposition temperature of the metal carbonyl with the highest decomposition temperature present in the hydroformylation mixture, removing the demetalled hydroformylation mixture admixed with water from the demetalling zone and passing said demetalled hydroformylation product to a separation zone maintained at the same pressure as that existing in the demetalling zone, removing water from said separation zone, and removing the demetalled hydroformylation product substantially free of water from said separation zone.

2. A process which comprises reacting an olefin with hydrogen and carbon monoxide in the presence of a cobalt salt at an elevated temperature and a pressure above about 1500 pounds per square inch to obtain a hydroformylation mixture comprising an aldehyde and at least one metal carbonyl, passing said mixture at a pressure of about 25 to about 500 pounds per square inch and a temperature initially below the decomposition temperature of the metal carbonyl with the lowest decomposition temperature at said latter pressure through a demetalling zone containing packing material, passing steam and an inert gas upwardly through said demetalling zone, the amount and pressure of said steam being adjusted to heat the hydroformylation mixture in the demetalling zone to the decomposition temperature of the metal carbonyl with the highest decomposition temperature present in the hydroformylation mixture, removing the demetalled hydroformylation mixture admixed with water from the demetalling zone and passing said demetalled hydroformylation product to a separation zone maintained at the same pressure as that existing in the demetalling zone, removing water from said separation zone, removing the demetalled hydroformylation product substantially free of water from said separation zone, reducing the pressure on said demetalled hydroformylation product from that existing in said separation zone to substantially atmospheric pressure, and thereafter filtering said demetalled hydroformylation product to remove solid material therefrom and prevent the formation of an emulsion.

3. A process which comprises reacting an olefin with hydrogen and carbon monoxide in the presence of a cobalt salt at an elevated temperature and a pressure above about 1500 pounds per square inch to obtain a hydroformylation mixture comprising an aldehyde and at least one metal carbonyl, passing said mixture at a pressure of about 25 to about 500 pounds per square inch and a temperature initially below the decomposition temperature of the metal carbonyl with the lowest decomposition temperature at said latter pressure through a demetalling zone containing packing material, passing steam and an inert gas upwardly through said demetalling zone, the amount and pressure of said steam being adjusted to heat the hydroformylation mixture in the demetalling zone to the decomposition temperature of the metal carbonyl with the highest decomposition temperature present in the hydroformylation mixture, removing the demetalled hydroformylation mixture admixed with water from the demetalling zone and passing said demetalled hydroformylation product to a separation zone maintained at the same pressure as that existing in the demetalling zone, removing water from said separation zone, removing the demetalled hydroformylation product substantially free of water from said separation zone, reducing the pressure on said demetalled hydroformylation product from that existing in said separation zone to substantially atmospheric pressure, passing said demetalled hydroformylation product at substantially atmospheric pressure and fresh water to a mixing zone wherein said hydroformylation product and fresh water are thoroughly admixed, passing the mixture from said mixing zone to a second separation zone, removing the demetalled hydroformylation product substantially free of water from said second separation zone, and removing the water from said second separation zone.

References Cited in the file of this patent

UNITED STATES PATENTS 2,514,961    Max _____ July 11, 1950

FOREIGN PATENTS 660,737    Great Britain _____ Nov. 14, 1951